(12) United States Patent
Liu et al.

(10) Patent No.: US 11,819,913 B2
(45) Date of Patent: Nov. 21, 2023

(54) WEAR RESISTANT LAYER

(71) Applicant: OERLIKON METCO (US) INC., Westbury, NY (US)

(72) Inventors: Wei Liu, Houston, TX (US); Zhongming Wang, Houston, TX (US); Andrew Bell, Willis, TX (US)

(73) Assignees: OERLIKON METCO (US) INC., Westbury, NY (US); OERLIKON METCO (US) INC., Westbury, NY (US)

( * ) Notice: Subject to any disclaimer, the term of this patent is extended or adjusted under 35 U.S.C. 154(b) by 137 days.

(21) Appl. No.: 16/760,330

(22) PCT Filed: Oct. 31, 2018

(86) PCT No.: PCT/IB2018/058540
§ 371 (c)(1),
(2) Date: Apr. 29, 2020

(87) PCT Pub. No.: WO2019/087097
PCT Pub. Date: May 9, 2019

(65) Prior Publication Data
US 2020/0346285 A1    Nov. 5, 2020

Related U.S. Application Data

(60) Provisional application No. 62/579,778, filed on Oct. 31, 2017.

(51) Int. Cl.
*B22F 1/052* (2022.01)
*C22C 29/08* (2006.01)
(Continued)

(52) U.S. Cl.
CPC ............... *B22F 1/052* (2022.01); *B22F 1/05* (2022.01); *B22F 1/09* (2022.01); *B22F 7/04* (2013.01);
(Continued)

(58) Field of Classification Search
CPC ........ B22F 1/052; B22F 7/04; B22F 2207/13; B22F 2301/20; B22F 2302/10; B22F 1/05;
(Continued)

(56) References Cited

U.S. PATENT DOCUMENTS 6,037,287 A    3/2000   Fukubayashi
6,294,129 B1   9/2001   Waldenström
(Continued)

FOREIGN PATENT DOCUMENTS

| CN | 101657554 | 2/2010 |
| CN | 102534343 | 7/2012 |

(Continued)

OTHER PUBLICATIONS

Dhanlal De Lloyd "Standard sieves and Mesh sizes," Chem. Dept, The University of The West Indies, St. Augustine campus (Year: 2004).*
(Continued)

*Primary Examiner* — Sally A Merkling
*Assistant Examiner* — Dean Mazzola
(74) *Attorney, Agent, or Firm* — GREENBLUM & BERNSTEIN, P.L.C.

(57) ABSTRACT

A mixture for forming a wear resistant layer on a substrate comprises particles of a first wear resistant particle type, particles of a second wear resistant particle type and a wear resistant layer binder for binding the first and the second wear resistant particles in the wear resistant layer when the layer is formed. As well, wear resistant particle size distri-
(Continued)

butions for the first and second wear resistant particle types have a first mode and a second mode. The first particle type is associated with the first mode and the second particle type is associated with the second mode. Moreover, a number of first wear resistant particles associated with the first mode is larger than a number of second wear resistant particles associated with the second mode. Further, the second mode is larger than the first mode.

19 Claims, 11 Drawing Sheets

(51) Int. Cl.
*B22F 1/05* (2022.01)
*B22F 1/00* (2022.01)
*B22F 7/04* (2006.01)
*C22C 26/00* (2006.01)
*C22C 29/02* (2006.01)
*C23C 4/129* (2016.01)

(52) U.S. Cl.
CPC .............. *C22C 26/00* (2013.01); *C22C 29/02* (2013.01); *C22C 29/08* (2013.01); *C23C 4/129* (2016.01); *B22F 2007/042* (2013.01); *B22F 2207/13* (2013.01); *B22F 2302/10* (2013.01); *B22F 2998/10* (2013.01); *B22F 2999/00* (2013.01)

(58) Field of Classification Search
CPC ...... B22F 1/09; B22F 2007/042; C22C 29/02; C22C 29/06; C22C 29/08; C22C 26/00; C22C 2026/006; C23C 4/129
See application file for complete search history.

(56) References Cited

U.S. PATENT DOCUMENTS

| | | | |
|---|---|---|---|
| 10,279,454 | B2 | 5/2019 | DiGiovanni et al. |
| 2004/0037948 | A1 | 2/2004 | Tank et al. |
| 2006/0127269 | A1 | 6/2006 | Caron |
| 2010/0276209 | A1* | 11/2010 | Yong ................. E21B 10/50 175/374 |
| 2011/0038710 | A1 | 2/2011 | Kemppainen et al. |
| 2012/0193148 | A1 | 8/2012 | Overstreet et al. |
| 2015/0093282 | A1 | 4/2015 | Bell |
| 2015/0093566 | A1 | 4/2015 | Bell |
| 2016/0348226 | A1 | 12/2016 | Chen et al. |
| 2017/0043347 | A1 | 2/2017 | Berflung et al. |
| 2019/0032189 | A1 | 1/2019 | Chen et al. |

FOREIGN PATENT DOCUMENTS

| | | |
|---|---|---|
| CN | 105143148 | 12/2015 |
| JP | 47-038563 | 11/1972 |
| JP | 49-023985 | 6/1974 |
| JP | 53-139613 | 12/1978 |
| JP | H02-006097 | 1/1990 |
| JP | H03-183530 | 8/1991 |
| JP | H06-220571 | 8/1994 |
| JP | H11-229103 | 8/1999 |
| JP | 2003-277875 | 10/2003 |
| RU | 2 521 924 | 7/2014 |
| RU | 2 562 656 | 9/2015 |
| WO | 2017/031163 | 2/2017 |
| WO | 2017/100733 | 6/2017 |

OTHER PUBLICATIONS

English translation of Russia Search Report conducted in counterpart Russia Appln. No. 2020115867/05 (dated Dec. 15, 2021).
English translation of Russia Office Action conducted in counterpart Russia Appln. No. 2020115867/05 (dated Dec. 22, 2021).
Europe Search Report and Office Action conducted in counterpart Europe Appln. No. 18873870.2 (dated Jul. 6, 2021).
Xu et al., "Comparison of sizing small particles using different technologies," Powder Technologies, vol. 132, No. 2-3 (Jun. 24, 2003) pp. 145-153.
Ganvir et al., "Characterization of Microstructure and Thermal Properties of YSZ Coatings Obtained by Axial Suspension Plasma Spraying (ASPS)", Journal of Thermal Spray Technology, Jun. 24, 2015.
Qiao et al., "Sliding and Abrasive Wear Resistance of Thermal-Sprayed WC—CO Coatings, Journal of Thermal Spray Technology", vol. 10, No. 1, Mar. 2001, pp. 118-125.
Viswanathan et al., "Multilayer, Multimaterial Thermal Barrier Coating Systems: Design, Synthesis, and Performance Assessment", Journal of the American Ceramic Society, Mar. 2015, pp. 1-9.
Int'l Search Report (Form PCT/ISA/210) conducted in Int'l Appln. No. PCT/IB2018/058540 (dated Jun. 3, 2019).
Int'l Written Opinion (Form PCT/ISA/237) conducted in Int'l Appln. No. PCT/IB2018/058540 (dated Jun. 3, 2019).
Japan Office Action conducted in counterpart Japan Appln. No. 2020-521400 (dated Sep. 14, 2022) (w/ translation).
China Second Office Action conducted in counterpart China Appln. No. 201880067533.8 (dated Aug. 30, 2022) (w/ translation).
Japan Search Report conducted in counterpart Japan Appln. No. 2020-521400 (dated Aug. 22, 2022) (w/ translation).
Japan Written Opinion conducted in counterpart Japan Appln. No. 2020-521400 (dated Feb. 13, 2023) (w/ translation).
Japan Notice of Reasons for Refusal conducted in counterpart Japan Appln. No. 2020-521400 (dated May 17, 2023) (w/ translation).

\* cited by examiner

WEAR RESISTANT LAYER

TECHNICAL FIELD

The invention disclosed herein generally but not exclusively relates to a powder for forming a wear resistant layer on a substrate, a wear resistant layer on a substrate, and a method for forming a wear resistant layer on a substrate.

BACKGROUND

Wear of a surface of a tool may necessitate tool replacement, especially if the replacement is premature relative to the tool's intrinsic economic life. Wear may be a result of the direct rubbing of the surface of the tool with a structure (two body abrasion), or the rubbing of the surface of the tool with at least one particle between the structure and the surface of the tool (three body abrasion). The tool surface may also be abraded by a particle carried by a fluid, for example a drilling fluid used in boring oil and gas wells.

A wear resistant layer in the form of hard coating (say, 0.1 mm thick) or hardfacing (say, <5 mm thick) may be deposited on the surface of the tool to improve the wear properties of the surface or repair the surface. Hardfacing is currently used in relation to industrial tools, earth engaging tools, and excavation and drilling tools including drill bits, drill strings and other downhole tools, for example. Wear may also be experienced by tools in the paper, automotive, glass manufacturing and other industries.

Generally, there is a long felt need for better, harder, and more consistent wear resistant layers that can be formed relatively easily.

SUMMARY

Disclosed herein is a mixture for forming a wear resistant layer on a substrate. The mixture comprises particles of a first wear resistant particle type, particles of a second wear resistant particle type and a wear resistant layer binder for binding the first and the second wear resistant particles in the wear resistant layer when the layer is formed. As well, wear resistant particle size distributions for the first and second wear resistant particle types have a first mode and a second mode. The first particle type is associated with the first mode and the second particle type is associated with the second mode. Moreover, a number $N_S$ of first wear resistant particles associated with the first mode is larger than a number $N_L$ of second wear resistant particles associated with the second mode. Besides, the second mode being larger than the first mode.

In the context of the invention a mode is the peak of the frequency distribution of the size of particles. The modes can thus be visualized as the highest peaks seen in the particle distribution. The mode represents the particle sizes (or size ranges) most commonly found in the distribution. The mode is in particular used if there is more than one peak in the particle distribution, and the different modes described in the particle distribution are helpful to describe the midpoint of the different peaks. Median values are defined as the value where half of the population resides above this point, and half resides below this point. For particle size distributions the median is called the D50. Generally, peaks of the particle distribution can be symmetric or non-symmetric. If the peak of the associated mode is symmetric the median equals the mode. If the peak of the associated mode is non-symmetric the median and the mode are different values (of the particle size). The term particle size can among others relate to volume, surface, diameter, and other magnitudes known in the state of the art to describe the particle size. Additional information regarding the analysis of particle size and the representation of particle size distribution can among others be obtained from ISO 9276-1, ISO 9276-2, ISO 13320-1, ISO 13320-1, ISO 13322-2, ISO 11277 and ISO 13317.

The mixture disclosed herein discloses the first and the second wear resistant particle types. The first and the second wear resistant particle types differ in that they are associated with different modes (peaks of the same particle distribution), i.e. there are first wear resistant particles (first particle type) associated with the first mode and second wear resistant particles (second particle type) associated with the second mode. Since the first and second particles are associated with different modes they differ in their size, but not necessary in their composition. According to the invention the smaller particle type has the higher number of particles and the bigger particle type has the smaller number of particles in the wear resistant layer/used in the method.

According to the invention the term first and second wear resistant particle type relates to at least to two different particles types. According to the invention there can exist a plurality of wear resistant particles (equivalent to first and second wear resistant particles), wherein a wear resistant particle size distribution for the plurality of wear resistant particles has a plurality of modes. Regarding the plurality of particle types the following applies. The smaller the particle type (i.e. the smaller the respective mode), the higher should be the number of the corresponding particles in the mixture/the wear resistant layer/used in the method.

The mixture for forming a wear resistant layer on a substrate can be used in a method according to the invention to form a wear resistant layer as described herein.

In special embodiments of the invention the mixture can be in the form of a powder.

In an embodiment, the number $N_L$ of second particles associated with the second mode are less than 30%%, especially between 5% and 30%, preferably between 15% and 30%, in particular between 15% and 25% of an total number $N_S+N_L$ of wear resistant particles. The number $N_S$ of first particles associated with the first mode may be more than 70%, especially between 70% and 95%, preferably between 70% and 85%, in particular between 75% and 85% of an total number $N_S+N_L$ of wear resistant particles.

In an embodiment, the second mode $m_L$ is larger than twice the first mode $m_S$ ($m_L>2\ m_S$), especially three times larger ($m_L>3\ m_S$), in particular four times larger than that of the first mode $m_S$ ($m_L>2\ m_S$). Larger can in particular relate to the volume of the particles associated with the mode or to another magnitude to the particles of the mode.

In an embodiment, the median size of the wear resistant particles (D50) associated with the first mode $D50_S$ is larger than twice that of the second mode $D50_L$ ($D50_S>2D50_L$), especially three times larger ($D50_S>3D50_L$), in particular four times larger than the median size of the of the second particles of the second mode ($D50_S>4D50_L$).

In an embodiment, each of the plurality of wear resistant particle types have a size in the range of 10 μm to 1.2 mm.

In an embodiment, each of the plurality of wear resistant particle types have a size in the range of 10 μm and 420 μm.

In an embodiment, the plurality of wear resistant particle types has a multimodal particle size distribution.

In an embodiment, the plurality of wear resistant particles comprises at least one of tungsten carbide, a eutectic mixture of di tungsten carbide ($W_2C$) and tungsten carbide (WC), natural diamond, encapsulated diamond grits, crushed polycrystalline diamond compacts, a carbide, a nitride, an oxide of a transition metal, spherical cast carbides, angular cast carbides, cemented tungsten carbide pellets, cemented tungsten carbide, cast tungsten carbide, and mono tungsten carbides.

In an embodiment, the wear resistant layer binder comprises metallic binding material.

In an embodiment, the metallic binding material comprises at least one of copper, tin, silver, cobalt, nickel, boron, cadmium, manganese, zinc, iron, chromium, bismuth, silicon or an alloy thereof.

An embodiment comprises 30%-50% by weight of wear resistant layer binder, 10%-30% by weight cast tungsten powder of a first size, and 30%-50% by weight tungsten carbide powder within of second size.

In an embodiment, the first particle size range is −40/60 ASTM standard mesh and the second particle size range is −100/325 ASTM standard mesh.

The total number $N_S+N_L$ of particles is within the meaning of the present invention the sum of the number of the plurality of wear resistant particles, in particular the sum of the number $N_S$ of first wear resistant particles associated with the first mode and the number $N_L$ of second wear resistant particles associated with the second mode.

Given a plurality of wear resistant particles, there usually exists a multimodal particle size distribution. A multimodal particle size distribution is a particle size distribution with a plurality (i.e. more than one mode/at least a first and a second) of modes and therefore a plurality of highest peaks seen in the particle distribution (or at least recognisable peaks). A multimodal particle distribution can be continuous and/or non-continuous. A multimodal particle distribution is continuous when the particle distribution comprises connected peaks, a multimodal particle distribution is non-continuous when the particle distribution comprises unconnected peaks. In general, the particle sizes of a non-continuous particle distribution, more precisely the particle sizes of the different modes, differ more than in a continuous particle size distribution.

Disclosed herein is a wear resistant layer on a substrate. The wear resistant layer comprises a first wear resistant particle type and a second wear resistant particle type bound together by a wear resistant layer binder. Moreover, wear resistant particle size distribution for the first, respectively the second wear resistant particle types have a first mode and a second mode. Thus, the first particle type is associated with the first mode and the second particle type is associated with the second mode. Besides, a number $N_S$ of the wear resistant particles of the first type is larger than a number $N_L$ of wear resistant particles of the second type, the second mode being larger than the first mode The wear resistant layer can be deposited on a substrate with a method according to the invention as described above.

In an embodiment, the number of second particles $N_L$ associated with the second mode are less than 30%%, especially between 5% and 30%, preferably between 15% and 30%, in particular between 15% and 25% of an total number $N_S+N_L$ of wear resistant particles. The number of first particles $N_S$ associated with the first mode may be more than 70%, especially between 70% and 95%, preferably between 70% and 85%, in particular between 75% and 85% of an total number of wear resistant particles.

In an embodiment, the second mode is larger than twice the first mode, especially three times larger, in particular four times larger than that of the first mode.

In an embodiment, the median size of the wear resistant particles (D50) associated with the first mode $D50_S$ is larger than twice that of the second mode $D50_L$ ($D50_S>2D50_L$), especially three times larger ($D50_S>3D50_L$), in particular four times larger than the median size of the of the second particles of the second mode ($D50_S>4D50_L$).

In an embodiment, each of the plurality of wear resistant particles have a size in the range of 10 μm to 1.2 mm, or a size in the range of 10 μm to 1 mm, or a size in the range of 10 μm to 420 μm, especially a size in the range of 10 μm to 350 μm, preferably a size in the range of 10 μm to 200 μm, in particular a size in the range of 10 μm to 50 μm. The plurality of wear resistant particles may have a size in the range of 10 μm and 420 μm.

In an embodiment, the plurality of wear resistant particles has a multimodal particle size distribution.

In an embodiment, the mixture comprises 35%-75%, especially 50%-70%, preferably 35%-60%, in particular 35%-50% by weight of the plurality of wear resistant particles and 25% to 65% especially 30%-50%, preferably 40%-65%, in particular 50%-65% by weight of the wear resistant layer binder.

In an embodiment, the mixture comprises 30%-50% by weight of wear resistant layer binder, 10%-30% by weight cast tungsten powder of a first size, and 30%-50% by weight tungsten carbide powder of second size range.

In an embodiment, the first size range is −40/60 ASTM standard mesh and the second particle size range is −100/325 ASTM standard mesh.

In an embodiment, the plurality of wear resistant particles comprises at least one of tungsten carbide, a eutectic mixture of di tungsten carbide ($W_2C$) and tungsten carbide (WC), natural diamond, encapsulated diamond grits, crushed polycrystalline diamond compacts, a carbide, a nitride, an oxide of a transition metal, spherical cast carbides, angular cast carbides, cemented tungsten carbide pellets, cemented tungsten carbide, cast tungsten carbide, and mono tungsten carbides.

In an embodiment, the wear resistant layer binder comprises a monolithic matrix of metallic binding material.

Disclosed herein is a method for forming a wear resistant layer on a substrate. The method comprises the steps of applying the mixture to the substrate, and heating the mixture of the first and second wear resistant particles and the wear resistant layer binder for forming the wear resistant layer.

The method can comprise the step of applying a first wear resistant particle type to the substrate, applying a second wear resistant particle type to the substrate, wherein a wear resistant particle size distribution for the first and the second wear resistant particle types has a first mode, respectively a second mode. Thus, the first particle type is associated with the first mode and the second particle type is associated with the second mode. Additionally, a number $N_S$ of wear resistant particles of the first type is larger than a number $N_L$ of wear resistant particles of the second type. Moreover, the second mode is larger than the first mode. The method further comprises the step of applying a wear resistant layer binder to the substrate. Moreover, the method also comprises the step of heating the first and second wear resistant particles and the wear resistant layer binder.

In an embodiment, the number of second particles $N_L$ associated with the second mode are less than 30%, especially between 5% and 30%, preferably between 15% and 30%, in particular between 15% and 25% of an total number $N_S+N_L$ of wear resistant particles. The number $N_S$ of first particles associated with the first mode may be more than 70%, especially between 70% and 95%, preferably between 70% and 85%, in particular between 75% and 85% of a total number $N_S+N_L$ of wear resistant particles.

In an embodiment, the second mode $m_L$ is larger than twice the first mode $m_S$ ($m_L>2\ m_S$), especially three times larger ($m_L>3\ m_S$), in particular four times larger than that of the first mode $m_S$ ($m_L>2\ m_S$). That a mode is larger than another mode means that the particle size at the respective mode is larger.

In an embodiment, the median size of the wear resistant particles (D50) associated with the first mode $D50_S$ is larger than twice that of the second mode $D50_L$ ($D50_S>2D50_L$), especially three times larger ($D50_S>3D50_L$), in particular four times larger than the median size of the of the second particles of the second mode ($D50_S>4D50_L$).

In an embodiment, each of the plurality of wear resistant particle types may have a size in the range of 10 μm to 1.2 mm, or a size in the range of 10 μm to 1 mm, or a size in the range of 10 μm to 420 μm, especially a size in the range of 10 μm to 350 μm, preferably a size in the range of 10 μm to 200 μm, in particular a size in the range of 10 μm to 50 μm.

In an embodiment, each of the plurality of wear resistant particles have a size in the range of 10 μm and 420 μm.

In an embodiment, the plurality (i.e. first and/or the second types) of wear resistant particles has a multimodal particle size distribution. In the context of this document, a "multimodal distribution" has two or more modes.

In an embodiment, the plurality of wear resistant particles comprises at least one of tungsten carbide, a eutectic mixture of di tungsten carbide ($W_2C$) and tungsten carbide (WC), natural diamond, encapsulated diamond grits, crushed polycrystalline diamond compacts, a carbide, a nitride, an oxide of a transition metal, round cast carbides, angular cast carbides, cemented tungsten carbide pellets, cemented tungsten carbide, cast tungsten carbide, and mono tungsten carbides.

In an embodiment, the wear resistant layer binder comprises metallic binding material and the metallic binding material is melted to form a monolithic matrix of metallic binding material.

In an embodiment, the method comprises the step of the metallic binding material so melted penetrating the plurality of wear resistant particles. Usually, if the method further comprises the step of melting the metallic binding material such that the first and/or the second wear resistant particles are penetrated by the metallic material, the first and/or the second wear resistant particles are penetrated by the metallic material to the extend, that for example porosities of, or cavities in the first and/or the second wear resistant particles are at least partly filled by the metallic material. The wear resistant layer binder contributes to toughness and holds the wear resistant particles together, but maybe easily worn away. While wear resistant particles provide wear resistance, by themselves they are too brittle to survive impact loading. The penetration of the first and/or second particles with the wear resistant layer binder can counteract the brittleness.

In an embodiment, the metallic binding material comprises at least one of copper, tin, silver, cobalt, nickel, boron, cadmium, manganese, zinc, iron, chromium, bismuth, silicon or an alloy thereof.

An embodiment of the method comprises applying to the substrate a mixture comprising the plurality of wear resistant particles and the wear resistant layer binder.

An embodiment comprises applying to the substrate a powder comprising the mixture.

In an embodiment, the mixture comprises 35%-75%, especially 50%-70%, preferably 35%-60%, in particular 35%-50% by weight of the plurality of wear resistant particles and 25% to 65% especially 30%-50%, preferably 40%-65%, in particular 50%-65% by weight of the wear resistant layer binder.

In an embodiment, the mixture comprises 30%-50% by weight of wear resistant layer binder, 10%-30% by weight cast tungsten powder of a first size, and 30%-50% by weight tungsten carbide powder of second size range.

In an embodiment, the first particle size range is −40/60 ASTM standard mesh and the second particle size range is −100/325 ASTM standard mesh.

In an embodiment, heating the plurality of wear resistant particles and the wear resistant layer binder comprises heating the mixture above a substrate adhesion temperature.

In an embodiment, heating the plurality of wear resistant particles and the wear resistant layer binder comprises heating the wear resistant layer binder to a temperature larger than at least one of a wear resistant layer binder softening temperature and a wear resistant layer binder melting temperature.

In an embodiment, the step of heating the plurality of wear resistant particle types and the wear resistant layer binder comprises the step of heating the plurality of wear resistant particles applied to the substrate and the wear resistant layer binder applied to the substrate.

An embodiment comprises the step of introducing the plurality of wear resistant particles into a flame directed at the substrate, the flame heating the plurality of wear resistant particles.

An embodiment comprises the step of introducing the wear resistant layer binder into the flame, the flame heating the wear resistant layer binder.

An embodiment comprises the step of introducing a mixture comprising the plurality of wear resistant particle types and the wear resistance layer binder into the flame directed at the substrate, the flame heating the mixture.

In an embodiment, the flame heats the mixture above a substrate adhesion temperature.

In an embodiment, the flame heats the wear resistant layer binder to a temperature larger than at least one of a wear resistant layer binder softening temperature and a wear resistant layer binder melting temperature.

An embodiment comprises the step of introducing the plurality of wear resistant particle types and the wear resistant layer binder into a plasma stream directed at the substrate, the plasma stream heating the plurality of wear resistant particles and the wear resistant layer binder.

An embodiment comprises the step of introducing a mixture comprising the plurality of wear resistant particle types and the wear resistant layer binder into the plasma stream.

In an embodiment, the plasma stream heats the wear resistance layer binder to a temperature larger than at least one of a wear resistant layer binder softening temperature and a wear resistant layer binder melting temperature.

An embodiment comprises the step of introducing the plurality of wear resistant particle types and the wear resistant layer binder separately into the plasma stream.

In an embodiment, the plurality of wear resistant particle types and the wear resistant layer binder are deposited onto a melted portion of the substrate outside of a plasma stream that heated the melted portion, the melted portion of the substrate heating the plurality of round particles and the wear resistant layer binder.

In the melted portion of the substrate heats the wear resistant layer binder to a temperature larger than at least one of a wear resistant layer binder softening temperature and a wear resistant layer binder melting temperature.

In an embodiment, the plurality of wear resistant particle types and the wear resistant layer binder are separated from the plasma stream by a separator.

In an embodiment, the separator comprises a separating structure. The separating structure may comprise a separating wall.

An embodiment comprises the step of moving a plasma stream across a surface of the substrate and a source of the plurality of wear resistant particle types, and a source of the wear resistant layer binder follows the plasma stream.

An embodiment comprises the step of delivering a shielding gas around the plasma stream.

In an embodiment, the wear resistant layer binder comprises a plurality of metallic particles.

In an embodiment, the plurality of metallic particles comprises a braze metal.

Any of the various features of each of the above disclosures, and of the various features of the embodiments described below, can be combined as suitable and desired.

BRIEF DESCRIPTION OF THE FIGURES

Embodiments will now be described, by way of example only, with reference to the accompanying figures in which.

DESCRIPTION OF EMBODIMENTS

Figure 1:
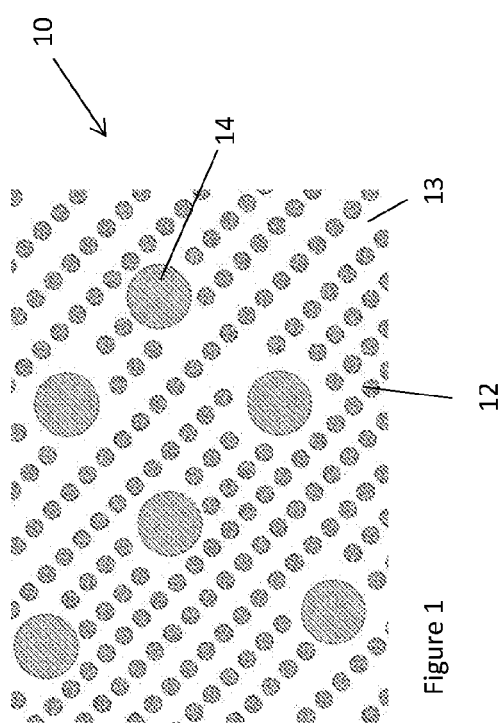

FIG. 1 shows a section through an embodiment of a wear resistant layer in the form of a hardfacing formed on a substrate and generally indicated by the numeral 10. The wear resistant layer 10 comprises a plurality of wear resistant particles, namely a first wear resistant particle type 12 and a second wear resistant particle type 14. The wear resistant layer 10 also comprises a wear resistant layer binder 13 for binding the plurality of wear resistant particles 12, 14 in the wear resistant layer when formed. A wear resistant particle size distribution for the plurality of wear resistant particles has a plurality of modes, wherein the number of wear resistant particles associated with a first mode of the plurality of modes is larger than the number of wear resistant particles associated with a second mode of the plurality of modes, the second mode being larger than the first mode.

Figure 2:
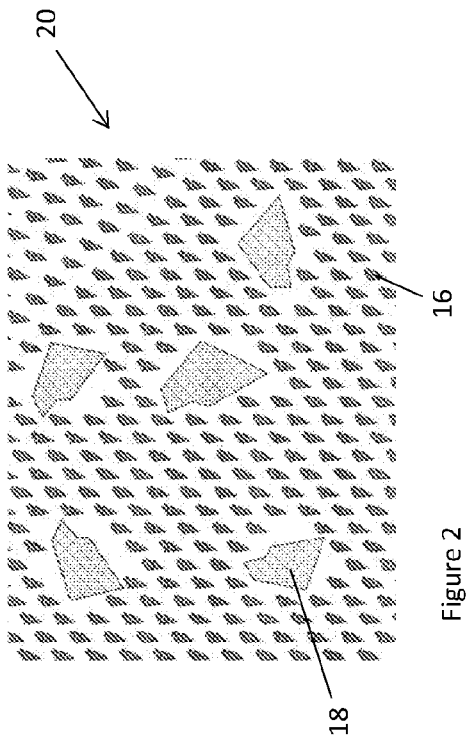
FIGS. 1-3 show a section through respective embodiments of a wear resistant layer.
Figure 3:
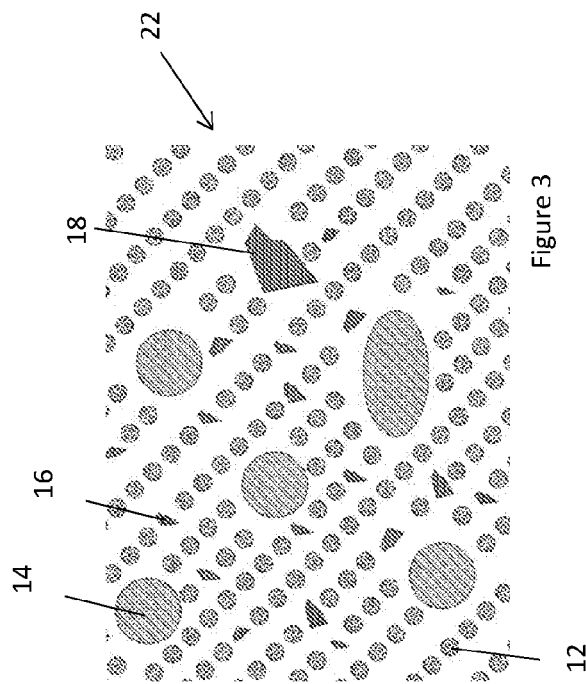

The first and the second wear resistant particles 12,14 comprises a plurality of round wear resistant particles (in the form of spherical wear resistant particles) in this embodiment. FIGS. 2 and 3 show sections through alternative embodiments of wear resistant layers 20, 22 having angular wear resistant particles 16,18.

The number $N_L$ of particles associated with the second mode are less than 30% of the plurality of wear resistant particles. The number $N_S$ of particles associated with the first mode is more than 70% of the plurality of wear resistant particles, however this may be less in embodiments that have more than 2 modes.

The second mode is larger than the first mode. In this embodiment, the median size of the wear resistant particles (D50) associated with the second mode is larger than twice that of the second mode.

The plurality of wear resistant particles 12, 14 may have a size in the range of 10 µm to 1.2 mm, and in this embodiment have a size in the range of 10 µm and 420 µm. Other embodiments may have particle sizes outside of these ranges, however. The particles sizes may be selected such that they can pass through a nozzle of a wear resistant layer applicator torch.

Figure 4:
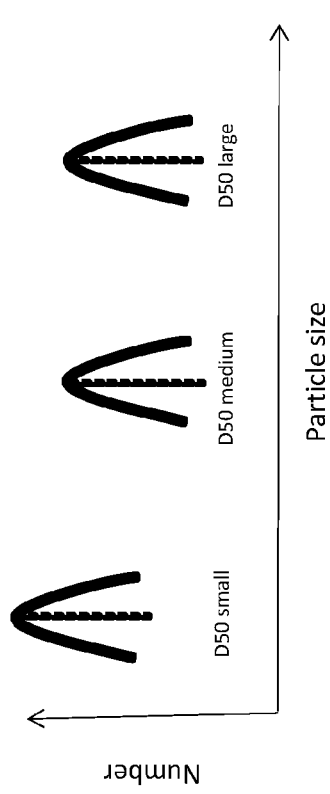
FIGS. 4-6 show particle size histograms for embodiments of a wear resistant layer and embodiments of a powder for forming the wear resistant layers.
Figure 5:
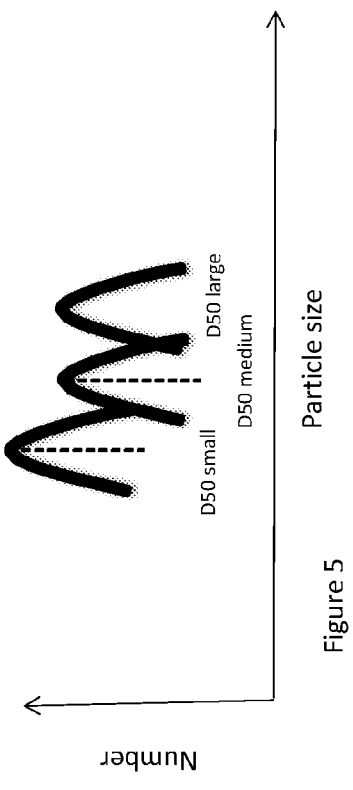
Figure 6:
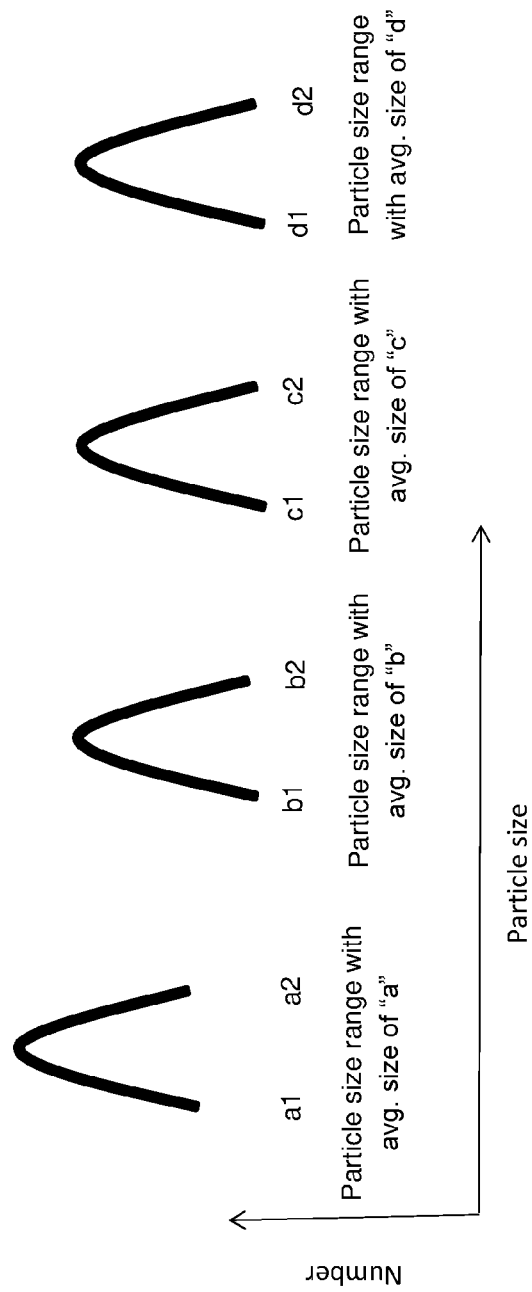

FIG. 4 shows a histogram for the size of a plurality of wear resistant particles in another embodiment of a wear resistant layer and a powder applied to form the wear resistant outer layer. The plurality of wear resistant particles has a multimodal particle size distribution. In this embodiment, the histogram comprises a plurality of unconnected peaks, that is the distribution is non-continuous. FIG. 5 shows a histogram for the size of the plurality of wear resistant elements for other embodiments of a wear resistant layer and a powder, wherein the multimodal distribution is continuous. FIG. 6 shows a multimodal histogram for a plurality of wear resistant particles for yet another embodiment of a wear resistant layer and powder. The histogram of FIG. 6 has 4 non overlapping peaks having different mean particle size a, b, c, and d, and wear resistant particles size ranges a1-a2, b1-b2, c1-c2, and d1-d2. There may be more or less peaks than shown in FIG. 6. The size dimensions have the following relationships:

$$a < b < c < d < \ldots$$

$$\frac{b1}{a2} > 1.1; \frac{c1}{b2} > 1.1; \frac{d1}{c2} > 1.1 \ldots$$

$$\frac{b}{a} > 1.5; \frac{c}{b} > 1.5; \frac{d}{c} > 1.5 \ldots.$$

The values in the above relationships may vary. The plurality of wear resistant particles comprises at least one of tungsten carbide, a eutectic mixture of di tungsten carbide ($W_2C$) and tungsten carbide (WC) ("cast tungsten carbide"), natural diamond, encapsulated diamond grits, crushed polycrystalline diamond compacts, a carbide for example tungsten carbide, tungsten, alumina, a nitride for example silicon nitride, an oxide of a transition metal, spherical cast carbides, angular cast carbides, cemented tungsten carbide pellets, cemented tungsten carbide, cast tungsten carbide, and mono tungsten carbides. The hardness of each of the plurality of wear resistant particles may be larger than 1000 $HV_{0.1}$.

The layer 10 comprises 35%-75% of the plurality of wear resistant particles and 25% to 65% by weight of the wear resistant layer binder. The layer 10 comprises 40 wt. % wear resistant binder in the form of nickel containing braze particles and 60 wt. % round cast tungsten carbides. The wear resistant layer binder contributes to toughness and holds the wear resistant particles together, but is easily worn away. The wear resistant particles provide wear resistance, but alone are too brittle to survive impact loading.

Particle sizes and particle size distributions may be determined using, for example, sieve analysis, microscope counting, computer micrograph analysis, or generally any suitable way. One measure of particle size is to specify a mesh that the particles pass through and another mesh that the particles do not pass through. Particles sizes may be determined using ASTM International (ASTM) compliant sieves, for example or generally any suitable plurality of sieves having different mesh sizes. Two sieves having different mesh sizes may be stacked and particles placed in the top sieve, which has larger holes than the bottom sieve. After agitating the stack, the particles retained by the lower sieve are known to have a size in a range that allows passage through the first sieve but not the second sieve. Retention is represented by adding the "+" sign in front of the mesh size. Passage is represented by adding the "−" sign in front of the mesh size. For example, particles of size −40/+60 ATSM mesh pass through a ASTM No. 40 sieve but cannot pass through a ASTM No. 60 sieve. A stack of more than two sieves may be used to determine a particle size distribution, for example.

An embodiment of a powder for forming an embodiment of a wear resistant layer comprises 20 wt. %−40/60 ATSM standard mesh wear resistant particles in the form of cast tungsten carbides and 40 wt. %−100/200 ASTM standard mesh wear resistant particles in the form of cast tungsten carbides, and thus 40 wt. % of a layer binder however these percentages may be varied. The wear resistant layer formed from the powder has the same composition. Other carbides may be used.

Another embodiment of a powder for forming an embodiment of a wear resistant layer comprises 30 wt. % iron binder and 70 wt. % wear resistant particles. More specifically, the powder comprises 20 wt. %−16/20 ASTM standard mesh super dense cemented tungsten carbide pellets, 10 wt. %−30/50 ASTM standard mesh super dense cemented tungsten carbide pellets, and 40 wt. %−100/200 ASTM standard mesh round cast tungsten carbides. The wear resistant layer formed from the powder has the same composition.

An embodiment of a powder for forming an embodiment of a wear resistant layer comprises 30%-50% by weight percent of wear resistant layer binder, 10%-30% by weight cast tungsten powder of a first size, and 30%-50% by weight tungsten carbide powder of a second size. The first particle size is in this embodiment −40/60 ASTM standard mesh and the second particle size is in this embodiment −100/325 ASTM standard mesh. The wear resistant layer formed from the powder has the same composition.

The wear resistant layer binder comprises metallic binding material in the form of a braze metal and the metallic binding material is melted to form a monolithic matrix of metallic binding material. The metallic binding material comprises a plurality of metallic particles which may, for example, comprise any suitable brazing metal, examples of which include copper, tin, silver, cobalt, nickel, boron, cadmium, manganese, zinc, iron, chromium, bismuth, silicon or an alloy thereof. The metallic particles may also comprise chromium that hardens the alloy formed on solidification of the molten powder. The wear resistant layer binder may also contain silicon and/or boron powder to aid in fluxing and deposition characteristics. In the present embodiment, the plurality of metallic particles comprises nickel, chromium, boron and silicon. Nickel may constitute 88%-95% by weight, chromium may constitute 0%-12%, boron may constitute 0%-1% and silicon may constitute 0%-1%. The hardness of the wear resistant layer may be less than 800 $HV_{0.1}$.

To form the mixture, the plurality of wear resistant particle types, the wear resistant layer binder, and other particles as used, may be mixed in an industrial blade mixer, tumbled in a tumble mixer, or generally mixed using any suitable mixing method. The mixture may be dry (i.e. a powder), or wet (i.e. a paste).

Figure 7:
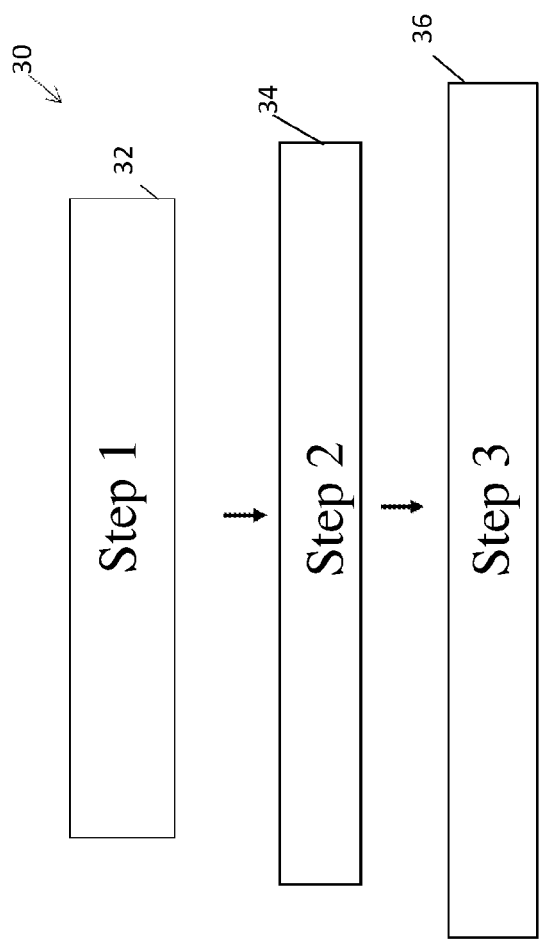
FIG. 7 shows a flow chart of an embodiment of a method for forming a wear resistant layer.

FIG. 7 shows a flow chat of an embodiment of a method 30 for forming the wear resistant layer 60 on a substrate 50 comprising a plurality of steps is now described. A step 1 (reference 32) comprises applying a plurality of wear resistant particles 12,14,16,18 to the substrate 60. A wear resistant particle size distribution for the plurality of wear resistant particles has a plurality of modes, wherein the number of wear resistant particles associated with a first mode $N_S$ of the plurality of modes is larger than the number of wear resistant particles associated with a second mode $N_L$ of the plurality of modes, the second mode being larger than the first mode. A step 2 (reference 34) comprises applying a wear resistant layer binder to the substrate. A step 3 (reference 36) comprises heating the plurality of wear resistant particles 12,14,16,18 applied to the substrate 50 and the wear resistant layer binder 13 applied to the substrate.

Figure 8:
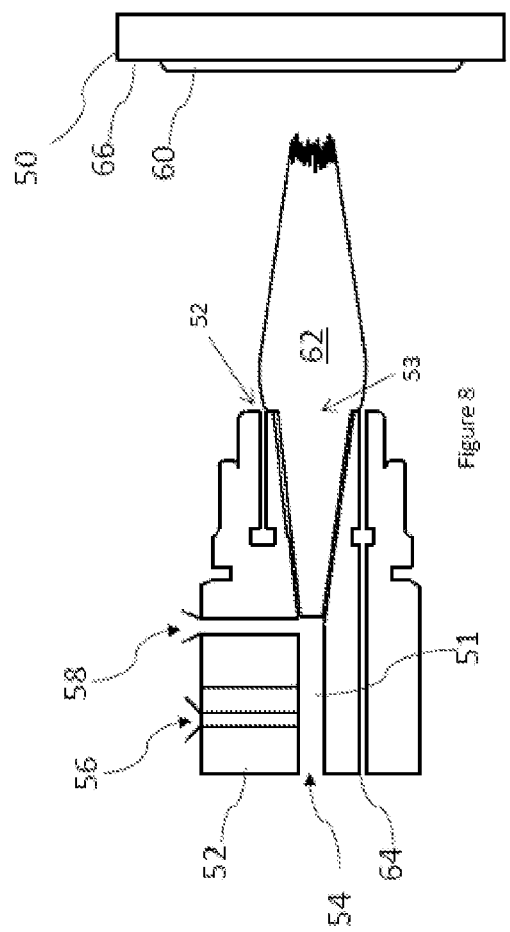
FIG. 8 shows an example of a head of an oxygen-fuel torch that may be used to apply embodiments of powders for forming embodiments of wear resistant layers.

FIG. 8 shows an example of a head of an oxygen-fuel torch 52 that may be used to apply a powder comprising the plurality of wear resistant particles 12,14,16,18 and the wear resistant layer binder 13 to the substrate 50 in accordance with the embodiment of the method 30. A surface 66 of the substrate 50 is optionally cleaned by application of a grinder. Alternatively, a chemical cleaning agent, or generally any suitable cleaning process may be used. The substrate 50 may be steel or generally any substrate for which the embodiment of the method 30 is suitable. In this example the gaseous fuel is acetylene. Acetylene introduced into port 54 of the oxyacetylene torch 52 may travel down a conduit 51 and exit the torch head 52 at a gas conduit opening 53 where it is combusted with oxygen introduced into port 64 to form a flame in the form of an oxy-acetylene flame 62. Generally, any suitable fuel may be used, examples of which include propane, hydrogen, and methane. In alternative embodiments, the oxygen may be introduced via port 54 and the acetylene may be introduced through the port 64. The flame 62 may be then optionally applied to the substrate 50 to preheat it. The powder may be then introduced into the stream of acetylene gas in conduit 51 via either one of powder feed ports 56 and 58. Alternatively, the plurality of wear resistant particles may be introduced through port 56, and the wear resistant layer binder may be introduced via port 58. This may overcome any potential or actual problems with segregation within the powder that may reduce wear resistant layer quality. The powder is carried along the conduit 51 by the acetylene into the flame 62 directed at the substrate 50 and which heats the plurality of wear resistant particles 12,14,16,18 and the wear resistant layer binder to above a substrate adhesion threshold temperature such that the plurality of wear resistant particles 12,14,16,18 and wear resistant layer binder 13 adheres to the substrate 50 when applied thereto to form a green layer, or in some alternative embodiments the wear resistant layer 60. The substrate adhesion threshold temperature may generally vary according to the powder composition. The substrate adhesion temperature may be larger than at least one of, for example, 500° C., 600° C. 700° C., 800° C., 900° C. and 1000° C. The flow of the powder may then be stopped. The flame 62 is then applied to the green layer (in this embodiment but not necessarily in all embodiments) with further powder in the acetylene stream) to heat it to a temperature above a wear resistant layer binder melting temperature. Consequently, the wear resistant layer binder melts to form a fluid in the form of a powder melt. The fluid and the particles therein flow over the surface of the substrate 50. The flame is then removed from the substrate 50. The fluid solidifies on cooling to form a wear resistant finer 60 comprising the plurality of wear resistant particles 12,14,16,18 distributed in and bound by the wear resistant layer hinder 13. Through diffusion, the wear resistant layer 60 is atomically bonded to the surface 66 of the substrate 50. The wear resistant layer 60 may be bonded differently in an alternative embodiment, for example, chemically.

Figure 9:
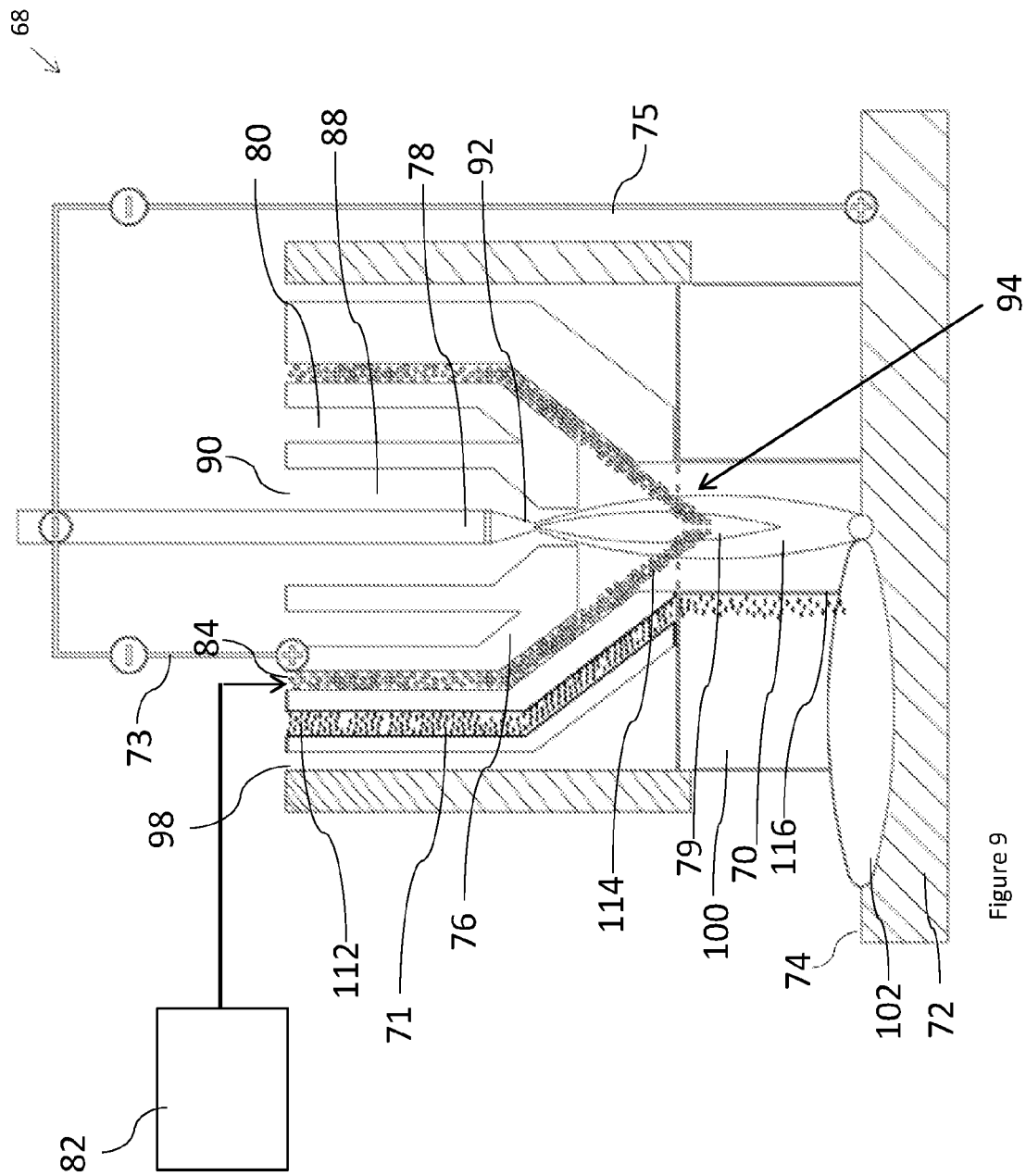
FIGS. 9 and 10 show examples of plasma transfer arc (PTA) torches that may be used to form a embodiments of wear resistant layer.

A wear resistance layer 60 may be formed on a substrate using other embodiments of the method. For example, a plasma transferred arc (PTA) surfacing process may be used. An example of a PTA torch 68 that may be used to form a wear resistant layer 102 is shown in FIG. 9. A gas (the "plasma gas") is injected via a plasma gas inlet port 90 into an electrode chamber 88 within a nozzle 76 of the PTA torch 68. Disposed in the electrode chamber 88 is an electrode 78 in the form of a tungsten electrode. The plasma gas flows past the tip 92 of the electrode 78 whereat a current flows through the plasma gas to form the plasma stream 70 that exits via a nozzle outlet 94. The plasma stream 70 has a temperature that is, in this but not necessarily all examples, between 15,000 and 25,000 degrees centigrade. The plasma stream 70 is directed at the surface 74 of the substrate 72. The current is generated by applying a potential difference 75 to the substrate 72 and the electrode 78. Additionally or alternatively, another potential difference 73 between the electrode 78 and the nozzle 76 may be applied. The potential differences 73, 75 are generated by a power supply. One of the potential differences 73, 75 may not be applied. For example, potential difference 75 may be used to form a pilot arc 79 that may, in some but not necessarily all embodiments, be extinguished after establishment of the constricted plasma stream 70. The powder 71 in the form of a mixture comprising the plurality of wear resistant particles and the wear resistant layer binder may be fed into the plasma stream 70 directed at the substrate 72. Generally, any suitable powder disclosed herein may be used. The powder 71 together with a stream of powder carrier gas in the form of, for example, argon, is introduced or fed into a port 84 of the nozzle 76 by a powder feeder 82 and communicated along a passage to a powder outlet 114 adjacent the nozzle outlet 94. The powder outlet 114 is disposed for introducing the powder 71 to the plasma stream 70 when so formed. The powder 71 so introduced into the plasma stream 70 is heated and delivered by the plasma stream 70 to the surface 74 of the substrate 72 to form the wear resistant layer 102. The nozzle 76 also has an optional shielding gas inlet 98 and a shielding gas outlet 100 arranged to optionally deliver the shielding gas around the plasma stream 70 when formed. The shielding gas may prevent the work zone from being exposed to oxygen that may oxidise the surface 74, the wear resistant layer 102 or the torch 73.

The nozzle 76 is generally but not necessarily fluid cooled by a fluid in the form of water (or alternatively air or any generally suitable liquid) flowing through liquid chambers 80 formed in the nozzle 76.

Figure 10:
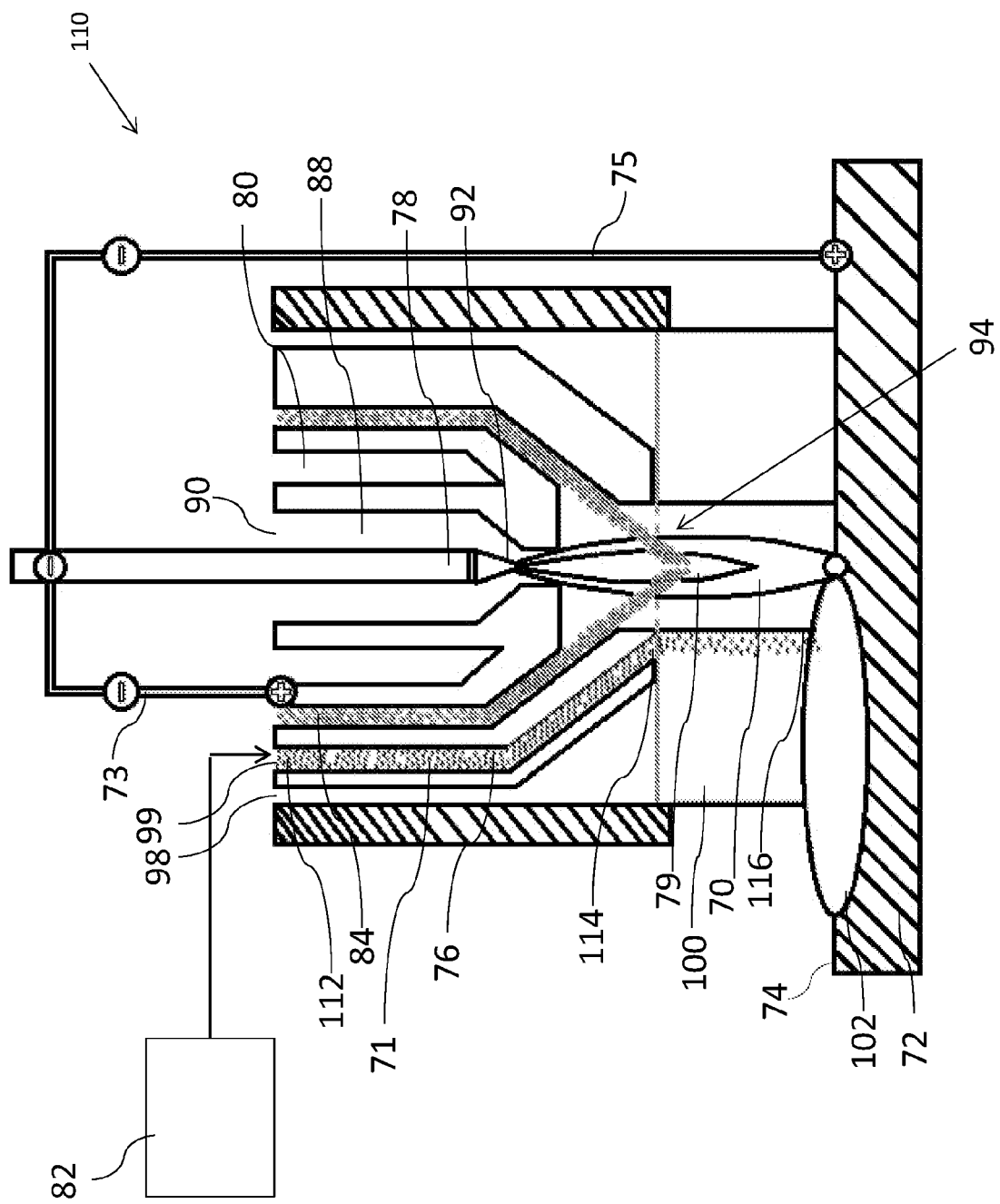

FIG. 10 shows another example of a PTA torch 110 that may be used to form a wear resistant layer 102. The PTA torch 110 is similar in form and function to the PTA torch 68 of FIG. 9 and parts of similar or identical form and/or function are similarly numbered. The PTA torch 110 of FIG. 10, however, is arranged such that the power 71 is not introduced into the plasma stream 70 so formed. The powder 71 together with a stream of powder carrier gas in the form of, for example, argon, is introduced or fed into a port 112 of the nozzle 76 by a powder feeder 82 and communicated along a passage to a powder outlet 114 disposed for deposition of the powder 71 on the surface 74 and outside of the plasma stream 70 when so formed. The powder outlet 114 is a source of the powder. The powder may be applied, in other embodiments, by another source separate from the torch 110 or generally by any suitable source. The separate source may be strapped or otherwise fixed to the PTA torch 110, but not necessarily. In this embodiment, but not necessarily in all embodiments, the powder outlet 114 is separated from the plasma stream nozzle outlet 94 by a separator in the form of a separating structure, in this embodiment a separating wall 116. In use, the PTA torch 110 is moved across the surface such that the powder outlet 114 follows the nozzle outlet 94. Consequently, the powder 71 is deposited onto a plasma melted portion of the surface 74 to form the wear resistant layer. This may reduce the temperature that the powder is exposed to, which may allow the use of powders that may otherwise be degraded by heat from the plasma stream. There may be separate outlets for the plurality of wear resistant particles and the wear resistant layer binder.

The plasma stream 70 heats the wear resistant layer binder and the plurality of wear resistant particles 12,14,16,18 to a temperature larger than at least one of a wear resistant layer binder softening temperature and a wear resistant layer binder melting temperature. The wear resistant layer binder cools and hardens to bind the plurality of wear resistant particles 12,14.

Before application of the powder 71 by one of the PTA surfacing processes described above, the surface 74 of the substrate 72 may be optionally cleaned by application of a grinder. Alternatively, a chemical cleaning agent, or generally any suitable cleaning process may be used. The substrate 72 may be steel or generally any substrate for which the method 30 is suitable. The surface may be preheated to 90-650 degrees centigrade prior to the PTA surfacing process by a resistive or inductive heater. Carbon and/or air quenched steels, for example, may be slow cooled after the PTA surfacing process.

In another embodiment, the plurality of wear resistant particles 12,14, 16, 18 and wear resistant layer binder may be fed separately into the plasma stream directed at the substrate 72. For example, the wear resistant layer binder may be introduced into port 84 and the plurality of wear resistant particles into port 99.

Figure 11:
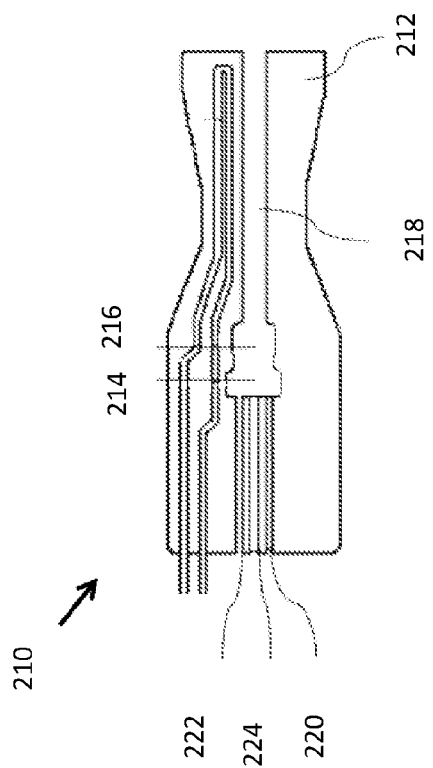
FIG. 11 shows an example of a HVOF torch.

The wear resistant layer may be formed using, for example high velocity oxy-fuel deposition (HVOF). An example of a HVOF torch (otherwise known as a HVOF gun) 210 is shown in FIG. 11. The torch 210 has a body 212 having a mixing chamber 214 and a combustion chamber 216 in communication with the mixing chamber. The torch 210 has a plurality of mixing chamber ports 220, 222 and 224. The torch 210 has a high-velocity jet passageway 218 that opens into the combustion chamber 216. Oxygen gas, a fuel in the form of oxyacetylene (or alternatively hydrogen, methane, propane, propylene, natural gas, kerosene, generally any suitable fuel or a mixture of these), and the powder are introduced via the ports 220, 222 and 224 into the mixing chamber to form a mixture. The powder passes into the combustion chamber 216 wherein the oxygen and fuel combust to form a high velocity gas jet in the form of a high velocity flame that carries the powder along the high-velocity jet passageway 218. The high velocity flame may have, as in this embodiment, a velocity of larger than 1000 m/s. At a distal end of the high-velocity jet passageway is an outlet through which the high velocity gas jet and the powder therein exits the torch 210. The high-velocity gas jet is directed at the substrate onto which the powder is applied to form the wear resistant layer.

Laser cladding is another way to deposit a wear resistant layer. Laser cladding uses high-energy laser beam as heat source. During the processing, the powder is fed into the focal spot of the laser beam, partially or fully melted and then solidified as the wear resistant layers with a metallurgical bonding with the substrate. The materials may comprise powders, cold wires and hot wires. Powder may be pre-placed on the substrate before processing. Powders may be supplied by a powder feeding line attached to a laser head fed along the axis of the laser beam. Co-axially powder feeding may assist the dimensional accuracy of the deposition and may produce high quality wear resistant layer.

The powders may be deposited by generally any suitable technique, including flame spray, plasma transferred arc (PTA), composite rod, tube rod, and rope. The wear resistant layer binder comprises metallic binding material and the metallic binding material is melted to form a monolithic matrix of metallic binding material.

EXAMPLES

An example of the wear resistant layer comprises a plurality of wear resistant particles having a multi-modal wear resistant particle size distribution, wherein the small sized wear resistant particles are more than 50 percent by weight, based on the total weight of the wear resistant particles 12,14, 16, 18.

Figure 12:
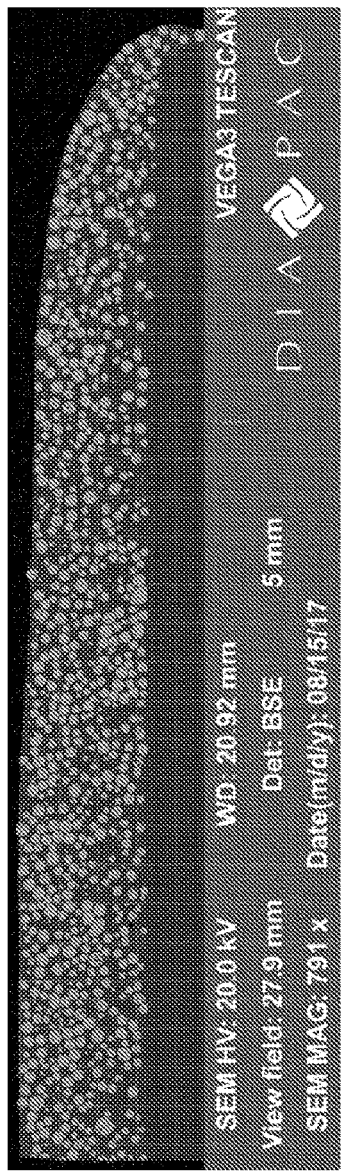
FIGS. 12-17 show scanning electron micrographs.
Figure 13:
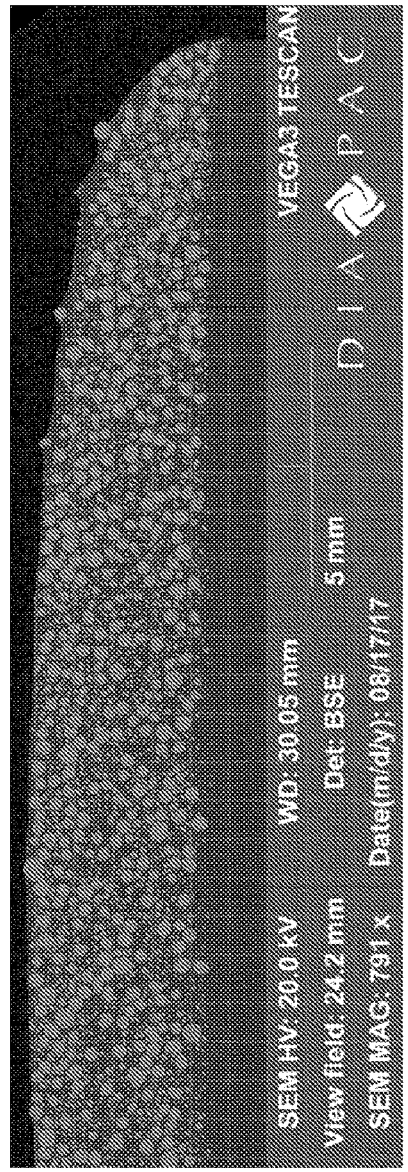
Figure 14:

Table 1 particularizes the composition of three wear resistant layer samples. The precursors of the three wear resistant layers were identically prepared and applied using a flame spray. The particle size histogram for the plurality of wear resistant particles in Composition A is monomodal, all being in a single range. FIG. 12 shows a panoramic scanning electron microscope image of the wear resistant layer having composition A. Composition B is the large sized wear resistant particles in the majority and the small sized wear resistant particles in the minority. FIG. 13 shows a panoramic scanning electron microscope image of the wear resistant layer having composition B. Composition C has the small sized wear resistant particles in the majority and the large sized wear resistant particles in the minority. The size distribution of the plurality of wear resistant particles in sample C is particularized in table 2. The median (D50) of the large sized particles is at least two times larger than the median of the small sized particles. The distribution of table 2 is bi-modal, and the larger particles are in the minority. FIG. 14 shows a panoramic scanning electron microscope image of the wear resistant layer having composition C. The volume fraction of the wear resistant particles was determined by image processing software for processing SEM images of the wear resistant layer.

Figure 16:
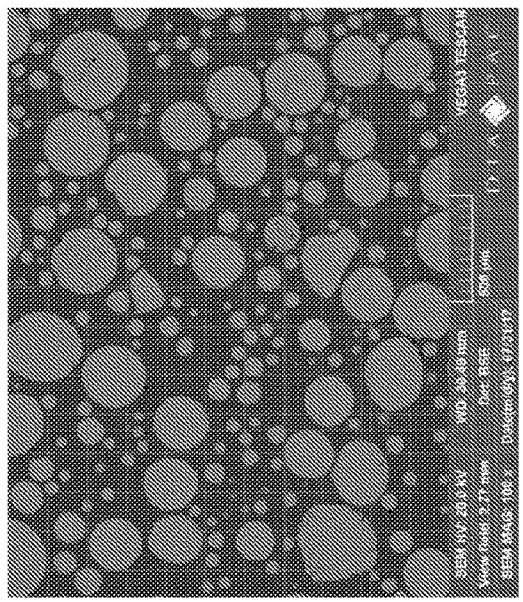
Figure 17:
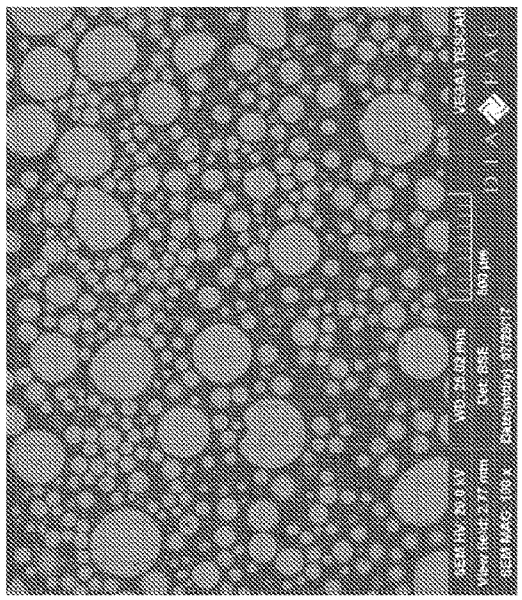
Figure 15:
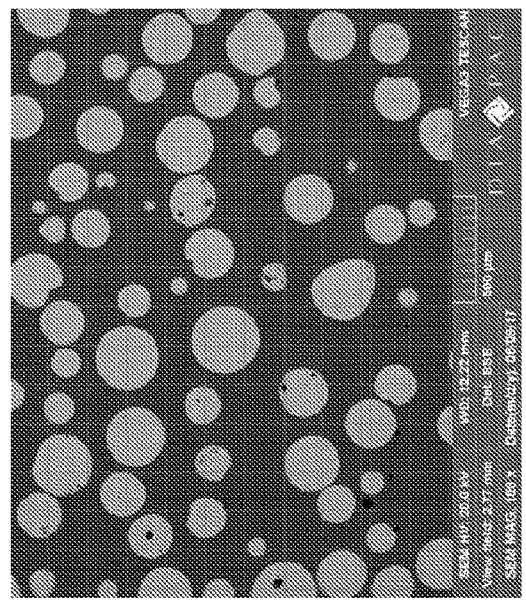

Cross section SEM images are shown in FIG. 15 (composition A), FIG. 16 (composition B) and FIG. 17 (composition C).

Composition C has the lowest wear loss and erosion volume loss, indicating that it may be superior than either one of B and C. Samples A and B have less wear resistant particles per unit volume (30 vol. % and 18 vol. % respectively) and lesser mean free paths.

TABLE 1

Composition of sample hardfacings.

| | Compositions | | Test data | | | |
| --- | --- | --- | --- | --- | --- | --- |
| Sample | Ni—Cr—B—Si braze metal | Spherical cast tungsten carbides | Volume fraction of round cast tungsten carbide, % | Mean free path (μm) | G65 wear loss (mm³) | Erosion volume loss at 45 degree impingement angle, cc |
| A | 40 wt. % | 60 wt. % 40/80 mesh | 39.3% | 264.2 | 11.81 | 0.15 |
| B | 40 wt. % | 43.8 wt. % 40/60 mesh + 16.2 wt. % 100/325 mesh | 43.2% | 119.6 | 7.88 | 0.21 |
| C | 40 wt. % | 20 wt. % 40/60 mesh + 40 wt. % 100/325 mesh | 51.0% | 68.5 | 6.98 | 0.11 |

The mean free path is the measure of the mean thickness of the wear resistant layer binder between carbide particles. The mean free path $\lambda$ is given by the equation, $\lambda=(1-f)/NL$, where f is the volume fraction of carbide particles, which is calculated by the SEM software, and NL is the number of the carbide particles per unit length intersected on a random line, which may be calculated from the SEM photographs.

If the mean free path is smaller than an erodent or abradant particle, then the wear resistant layer binder is mostly protected and preferential removal of the wear resistant layer binder is not the predominant wear mechanism. Having a smaller mean-free-path may be therefore desirable. Larger particles have a longer retention time within the wear resistant layer binder and protect the smaller particles from wear. Having both in concert is therefore desirable.

TABLE 2

The distribution of the plurality of wear resistant particles in sample C.

| Particle Diameter (μm) Lower | Particle Diameter (μm) upper | Particle numbers in the size range | Percent of total particle numbers, % |
| --- | --- | --- | --- |
| 13.6 | 51.1 | 126 | 29.4% |
| 51.1 | 88.5 | 221 | 51.6% |
| 88.5 | 126 | 55 | 12.9% |
| 126 | 163.4 | 12 | 2.8% |
| 163.4 | 200.8 | 1 | 0.2% |
| 200.8 | 238.3 | 1 | 0.2% |
| 238.3 | 275.7 | 5 | 1.2% |
| 275.7 | 313.2 | 3 | 0.7% |

TABLE 2-continued

The distribution of the plurality of wear resistant particles in sample C.

| Particle Diameter (μm) Lower | Particle Diameter (μm) upper | Particle numbers in the size range | Percent of total particle numbers, % |
|---|---|---|---|
| 313.2 | 350.6 | 3 | 0.7% |
| 350.6 | 388 | 1 | 0.2% |

To test the abrasion resistance of the sample hardfacings, the wear test was conducted as per the parameters and setups of ASTM G65 Procedure A (130N @ 6000 revolutions).

The slurry erosion resistance of the depositions was determined using an abrasive Water Jet (AWJ). The stream of Barton garnet HPX #220 particles with an average size of 108 μm was introduced into a small diameter water jet such that the water jet's momentum was partly transferred to the abrasive particles. The garnet particles are accelerated to a high velocity and are then directed towards the work piece for the erosion test. At a small impingement angle (<30 degree), the material removal of the eroded samples was mainly due to cutting or ploughing, with the preferential removal of the soft metal alloys leaving the primary wear resistant particles exposed to the surface. At large impingement angle, the impact force dominates the material removal and causes the fractures of many wear resistant particles.

Figure 19:
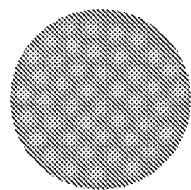
FIGS. 18-20 show cross sectional views through the outlet nozzle of a torch during use.
Figure 20:
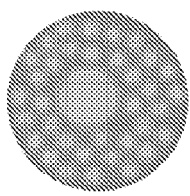
Figure 18:
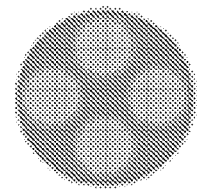

FIGS. 18, 19 and 20 show cross sections of a flame spray torch outlet nozzle in which are three difference powders. A powder comprising a combination of small and large particles is less likely to block the nozzle than a powder comprising large particles only. Therefore the combined powder may result in a more even flow, and may result in a larger packing density in the wear resistant layer.

Applications

The substrate may generally be any suitable substrate, examples of which include, but are not limited to a drill bit used by the mining or another industry, other down-hole equipment, the teeth of a bucket for an excavator, a chisel, and a blade.

The powder may be used to form a wear resistant layer on any suitable substrate. Some suggested applications are now further described, however it will be appreciated that there are many applications of the wear resistant layer.

Stabilizers are used in the exploration and production of oil and gas. Their function is to provide stability to the drill bit and maintain dimensional control of the hole. Large sections of the stabilizer are in direct contact with the walls of the hole or steel casing. Through rotation of the drill string and progressive drilling, protective particles and hard facings are prone to wear which may eventually result in repair, end-of-life or dimensionally unacceptable diameters. Stabilizes having wear resistant layers described herein applied thereto may reduce or eliminate these issues.

Rotary bi- and tri-cone drill bits are manufactured with protrusions or "teeth" that are machined from parent steel. A drill bit having a wear resistant layer described herein applied thereto may have increased life and exhibit reduced "teeth" wear, which may increase drilling performance and productivity.

During mechanical excavation and removal of rock, significant wear can be seen on excavator teeth and buckets. Excavator teeth and buckets having a wear resistant layer described herein applied thereto may have prolonged life and consequently replacement costs may be reduced.

The outside diameter of a polycrystalline diamond drill bit is subject to sliding wear. A polycrystalline drill bit having a wear resistant layer described herein applied thereto may have an increased serviceable life.

During the life of a polycrystalline diamond drill bit the body and blades of the bit that support the cutting structure may be subject to life-limiting wear. Bodies and blades having a wear resistant layer described herein applied thereto may reduce erosive wear, which may increasing tool life and reduce costs.

Picks are used during the mechanical excavation of rock and the surface dressing of road surfaces. A pick is manufactured generally in two-pieces; body and insert. The body is conventionally steel and the insert commonly cemented carbide. In some circumstances diamond containing inserts are used. Body life is generally limited by excessive wear or "Wash". A body having a wear resistant layer as described herein and in close proximity to the insert may have prolonged life, and reduce down time required for replacing worn picks.

Crusher teeth may be used in various applications including in the mechanical extraction of oil from oil containing sand. The crusher teeth may be positioned around a rotating drum and mechanically interact with the rock, sand and oil. Wear may be great. Crusher teeth having a wear resistant layer as described herein applied thereto may have prolonged life.

In the context of gas and oil drilling, a mud-powered motor drives bit rotation and torque. The motor may contain both radial and axial bearings that are in sliding contact with opposing bearings or rolling particles. A bearing having a wear resistant layer as described herein applied thereto may significantly increase bearing life, reduce bearing length and offer the ability for more sets of bearings that promote higher bit-weights and better productivity when drilling for oil and gas.

Now that embodiments have been described, it will be appreciated that some embodiments have some of the following advantages:

Compared to conventional compositions in which carbides have mono-modal particle size distributions, embodiments have improved packing density and volume fractions of wear resistant particles in the wear resistant layer, which then reduce the mean free path, increases the resistance to abrasion and erosion, without sacrificing the resistance to cracking.

The wear resistant layer composition may obtain better performance than prior art wear resistant coating layers with less mass density of hard particles, and may be more crack resistance.

Variations and/or modifications may be made to the embodiments described without departing from the spirit or ambit of the invention. The round wear resistant elements may be spherical wear resistant elements. For example, while the substrate disclosed above is steel, it will be appreciated that embodiments may be used on other substrate materials, for example another metal such as aluminium, a cemented carbide, or generally any suitable substrate material. The powder may be poured or otherwise applied onto the substrate. The powder may be fused by heating the substrate and powder thereon in a furnace. The wear resistant layer may be a coating or a hardfacing. The wear resistant layers described are wear resistant outer layers, however they may not be an outer layer any may have additional layers thereon. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A mixture for forming a wear resistant layer on a substrate, the mixture comprising:
    round cast particles of a first wear resistant particle type and round cast particles of a second wear resistant particle type, the first and second wear resistant particle types comprising tungsten carbide (WC); and
    a wear resistant layer binder for binding the first and the second wear resistant particles in the wear resistant layer when formed,
    wherein wear resistant particle size distributions for the first and second wear resistant particle types have a first mode and a second mode, respectively, in which the first mode comprises the first wear particle type and the second mode comprises the second wear particle type,
    wherein a number NS of the first wear resistant particles of the first mode is larger than a number NL of the second wear resistant particles of the second mode, and wherein the second wear resistant particles are larger than the first wear resistant particles, and
    wherein the mixture comprises 35%-75% by weight of the first and second wear resistant particles, and 25% to 65% by weight of the wear resistant layer binder.

2. The mixture defined by claim 1, wherein the mixture is in the form of a powder.

3. The mixture defined by claim 1, wherein, for a total number of wear particles, NS+NL, the number NL of the second particles of the second mode is less than 30% and the number NS of first particles of the first mode is more than 70% of a total number NS+NL of wear resistant particles.

4. The mixture defined by claim 3, wherein the number NL of the second particles of the second mode is one of:
    between 5% and 30%,
    between 15% and 30%, or
    between 15% and 25%, and
wherein the number NS of the first particles of the first mode is one of:
    between 70% and 95%,
    between 70% and 85%, or
    between 75% and 85%.

5. The mixture defined by claim 1, wherein the second mode is larger than twice the first mode.

6. The mixture defined by claim 5, wherein the second mode is at least one of three times larger than the first mode or four times larger than of the first mode.

7. The mixture defined by claim 1, wherein a median size $D50_L$ of the second wear resistant particles is larger than twice a median size $D50_S$ of the first wear resistant particles.

8. The mixture defined by claim 7, wherein the median size $D50_L$ is at least one of three times larger than median size $D50_S$, or four times larger than the median size $D50_S$.

9. The mixture defined by claim 1, wherein the first and the second wear resistant particles have a size in the range of 10 µm to 1.2 mm.

10. The mixture defined by claim 9, wherein the first and the second wear resistant particles have a size in the range of at least one of: 10 µm to 1 mm, 10 µm to 420 µm, 10 µm to 350 µm, 10 µm to 200 µm, or 10 µm to 50 µm.

11. The mixture defined by claim 1, wherein the tungsten carbide (WC) are mono tungsten carbides.

12. The mixture defined by claim 1, wherein the wear resistant layer binder comprises a metallic binding material.

13. The mixture defined by claim 12, wherein the metallic binding material comprises at least one of copper, tin, silver, cobalt, nickel, boron, cadmium, manganese, zinc, iron, chromium, bismuth, silicon or an alloy thereof.

14. The mixture defined by claim 1, wherein the mixture comprises 50%-70% by weight of the first and second wear resistant particles, and 30%-50% by weight of the wear resistant layer binder.

15. The mixture defined by claim 1, wherein the mixture comprises 30%-50% by weight of wear resistant layer binder, 10%-30% by weight cast tungsten powder within a first size range, and 30%-50% by weight tungsten carbide powder within a second size range.

16. The mixture defined by claim 1, wherein the mixture comprises:
    at least one of: 35%-60% by weight, or 35%-50% by weight of the first and second wear resistant particles, and
    at least one of: 40%-65% by weight, 50%-65% by weight of the wear resistant layer binder.

17. A method for forming a wear resistant layer on a substrate with the mixture of claim 1, the method comprising:
    applying the mixture to the substrate; and
    heating the mixture of the first and second wear resistant particles and the wear resistant layer binder for forming the wear resistant layer.

18. The method defined by claim 17, wherein the wear resistant layer binder comprises metallic binding material, the method comprises melting the metallic binding material to form a monolithic matrix of metallic binding material, and the method further comprising melting the metallic material such that the first and/or the second wear resistant particles are penetrated by the metallic material.

19. The method defined by claim 17, wherein the method further comprises heating the mixture, therefore heating the first and second wear resistant particles and the wear resistant layer binder, especially comprising heating the mixture above a substrate adhesion temperature.

* * * * *